(12) United States Patent
Morrow et al.

(10) Patent No.: US 10,823,664 B2
(45) Date of Patent: Nov. 3, 2020

(54) ULTRAFAST, MULTIPHOTON-PUMP, MULTIPHOTON-PROBE SPECTROSCOPY

(71) Applicant: Wisconsin Alumni Research Foundation, Madison, WI (US)

(72) Inventors: Darien James Morrow, Madison, WI (US); Daniel David Kohler, Madison, WI (US); John Curtis Wright, Oregon, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/446,750

(22) Filed: Jun. 20, 2019

(65) Prior Publication Data
US 2019/0391070 A1 Dec. 26, 2019

Related U.S. Application Data

(60) Provisional application No. 62/688,520, filed on Jun. 22, 2018.

(51) Int. Cl.
*G01N 21/25* (2006.01)
*G01N 21/63* (2006.01)
*G01N 21/17* (2006.01)

(52) U.S. Cl.
CPC ......... *G01N 21/255* (2013.01); *G01N 21/636* (2013.01); *G01N 2021/1791* (2013.01)

(58) Field of Classification Search
CPC ...... G01N 21/25; G01N 21/255; G01N 21/63; G01N 21/636; G01N 2021/1791
See application file for complete search history.

(56) References Cited

U.S. PATENT DOCUMENTS

| 7,092,086 B2 | 8/2006 | Knebel |
| 9,267,893 B2 | 2/2016 | Wright et al. |

(Continued)

FOREIGN PATENT DOCUMENTS

WO     WO 9107651     5/1991

OTHER PUBLICATIONS

Boyle et al., Fully Coherent Triple Sum Frequency Spectroscopy of a Benzene Fermi Resonance, The Journal of Physical Chemistry A, vol. 117, Jun. 17, 2013, pp. 5578-5588.

(Continued)

*Primary Examiner* — Jamil Ahmed
(74) *Attorney, Agent, or Firm* — Bell & Manning, LLC

(57) ABSTRACT

Methods for pump-probe spectroscopy are provided. In an embodiment, such a method comprises directing pump light having a frequency $\omega_{pump}$ at a location in a sample to excite a transition between two quantum states of a target entity in the sample, directing probe light at the location to generate a coherent output signal having a frequency $\omega_{output}$ and a wavevector $k_{output}$, and detecting the output signal as the probe light is scanned over a range of frequencies. In the method, either the transition excited by the pump light is a multiphoton transition corresponding to a frequency difference of $n*\omega_{pump}$, wherein $n \geq 2$; or the probe light is a set of m coherent light pulses, each coherent light pulse having a frequency $\omega_m$ and a wavevector $k_m$, wherein $m \geq 2$; or both. Systems for carrying out the methods are also provided.

36 Claims, 14 Drawing Sheets

(56) References Cited

U.S. PATENT DOCUMENTS

2008/0012850 A1    1/2008   Keating, III
2017/0276920 A1*   9/2017   Frankel .............. G01N 21/6458

OTHER PUBLICATIONS

Cheng et al., Coherent Anti-Stokes Raman Scattering Microscopy: Instrumentation, Theory, and Applications, J. Phys. Chem. B, vol. 108, Dec. 25, 2003, pp. 827-840.

Denk et al., Two-Photon Laser Scanning Fluorescence Microscopy, Science, vol. 248, Apr. 6, 1990, pp. 73-76.

Potma et al., Heterodyne coherent anti-Stokes Raman scattering (CARS) imaging, Optics Letters, vol. 31, No. 2, Jan. 15, 2006, pp. 241-243.

Boyle et al., Fully Coherent Hybrid Raman-IR Multidimensional Spectroscopies, Poster, Society for Applied Spectroscopy, SciX, Milwaukee, WI, Sep. 29, 2013.

Morrow et al., Multi-photon pump, multi-photon spectroscopies and their application to $MX_2$ nanostructures, Poster, presented at the 9th International Conference on Coherent Multidimensional Spectroscopy, Korea University, Seoul, South Korea, Jun. 27, 2018.

M. Cho, Theoretical description of two-dimensional vibrational spectroscopy by infrared-infrared-visible sum frequency generation, Physical Review A, vol. 61, Jan. 2000, pp. 023406-1-023406-12.

M. Cho, Triply resonant infrared-infrared-visible sum frequency generation: Three-dimensional vibronic spectroscopy for the investigation of vibrational and vibronic couplings, Journal of Chemical Physics, vol. 112, No. 20, May 22, 2000, pp. 9002-9014.

M. Cho, Two-dimensional vibrational spectroscopy. VII. Investigation of the vibronic and vibrational couplings by using novel triply resonant two-dimensional vibrational spectroscopies, Journal of Chemical Physics, vol. 113, No. 18, Nov. 8, 2000, pp. 7746-7755.

Bonn et al., Novel Surface Vibrational Spectroscopy: Infrared-Infrared-Visible Sum-Frequency Generation, Physical Review Letters, vol. 86, No. 8, Feb. 19, 2001, pp. 1566-1569.

M. Cho, Lateral interactions between adsorbed molecules: Investigations of CO on Ru(001) using nonlinear surface vibrational spectroscopies, Physical Review B, vol. 65, May 23, 2002, pp. 205423-1-205423-10.

Hess et al., Doubly vibrationally resonant spectroscopy of CO on Ru(001), Surface Science, vol. 502-503, 2002, pp. 123-128.

Morrow et al., Triple sum frequency pump-probe spectroscopy of transition metal dichalcogenides, Physical Review B 100, Dec. 4, 2019, pp. 235303-1 to 235303-16.

* cited by examiner

US 10,823,664 B2

ULTRAFAST, MULTIPHOTON-PUMP, MULTIPHOTON-PROBE SPECTROSCOPY

CROSS-REFERENCE TO RELATED APPLICATIONS

The present application claims priority to U.S. Provisional Patent Application No. 62/688,520 that was filed Jun. 22, 2018, the entire contents of which are hereby incorporated by reference.

REFERENCE TO GOVERNMENT RIGHTS

This invention was made with government support under DE-SC0002162 awarded by the US Department of Energy. The government has certain rights in the invention.

BACKGROUND

Measuring ultrafast dynamics is essential to understanding the fundamental nature of important phenomena like charge transfer across a heterojunction. Techniques like transient absorption (TA) spectroscopy are used by many researchers to resolve ultrafast dynamics. In this method, a pump excites the system of interest, and a probe follows an extremely short time later and takes a snapshot of the system as it evolves back to its unexcited state. The snapshot is measured on a detector. Finally, the pump is chopped to create a difference spectrum which shows how the excited sample's absorption spectrum differs from the unexcited sample's absorption spectrum.

Synthesis, characterization, and rational design of nanostructures are points of focus in current research. For instance, nanostructures are being used to build next-generation solar cells. However, nanostructures present a problem for methods like TA because the nanostructures can extensively scatter pump light and saturate the detector. Many researchers choose to have the color of their pump sufficiently different from the color(s) of their probe beam so as to avoid saturating their detector with scattered pump light.

SUMMARY

The present disclosure describes new methods and systems for pump-probe spectroscopy. The methods achieve increased contrast and/or reduced scatter as compared to conventional pump-probe spectroscopic methods, including transient absorption spectroscopy.

In one aspect, methods for pump-probe spectroscopy are provided. In an embodiment, such a method comprises directing pump light having a frequency $\omega_{pump}$ at a location in a sample to excite a transition between two quantum states of a target entity in the sample, directing probe light at the location to generate a coherent output signal having a frequency $\omega_{output}$ and a wavevector $k_{output}$, and detecting the output signal as the probe light is scanned over a range of frequencies. In the method, either the transition excited by the pump light is a multiphoton transition corresponding to a frequency difference of $n*\omega_{pump}$, wherein $n \geq 2$; or the probe light is a set of m coherent light pulses, each coherent light pulse having a frequency $\omega_m$ and a wavevector $k_m$, wherein $m \geq 2$; or both.

In another aspect, systems for carrying out the methods are also provided. In embodiments, such a system comprises optics configured to direct pump light having a frequency $\omega_{pump}$ at a location in a sample and to direct probe light at the location; a stage configured to support the sample; a detector positioned to detect an output signal; and a controller comprising a processor and a computer-readable medium operably coupled to the processor. The computer-readable medium has computer-readable instructions stored thereon that, when executed by the processor, cause the system to illuminate the location with the pump light having the frequency $\omega_{pump}$ to excite a transition between two quantum states of a target entity in the sample; illuminate the location with the probe light to generate a coherent output signal having a frequency $\omega_{output}$ and a wavevector $k_{output}$; and collect the detected the output signal as the probe light is scanned over a range of frequencies. The transition excited by the pump light is a multiphoton transition corresponding to a frequency difference of $n*\omega_{pump}$, wherein $n \geq 2$; or the probe light is a set of m coherent light pulses, each coherent light pulse having a frequency $\omega_m$ and a wavevector $k_m$, wherein $m \geq 2$; or both.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows the 1pu-1pr (1pump-1probe) experiment in which two electric field interactions create a population. The population is then probed with a third electric field; the resultant coherence emits an electric field which is detected. FIG. 1B shows the same experiment as FIG. 1A but with a three-photon probe in which three electric field interactions create the output coherence instead of one. This experiment is notated as 1pu-3pr (1pump-3probe). FIG. 1C shows the same experiment as FIG. 1A except four electric field interactions are required to create the initial population. Hence FIG. 1C shows two-photon absorption and is notated as 2pu-1pr (2pump-1probe). FIG. 1D combines FIGS. 1B and 1C in which four electric field interactions accomplish two-photon absorption to create the excited population. The population is then probed with three electric field interactions which create the output coherence. Note: only the "excited state absorption" pathway is shown; other pathways exist.

The transitions are time ordered from left to right. They sequentially excite multiple quantum coherences (MQC) of different combinations of vibrational and electronic states. Pairs of coupled states (ij) within the MQC oscillate at their difference frequency, $\omega_{ij}$, and launch their own electromagnetic fields represented by the last arrow (right-most). The sequences of solid and dotted arrows denote the pathways that excite the i and j states, respectively. Matching the phases of the n coherences within the excitation volume results in cooperative emission of output beams in directions where they constructively interfere. Multidimensional spectra result from measuring the enhancement in the output beam intensity as the excitation frequency scans across vibrational and electronic resonances. The incoherent and coherence dynamics are measured by changing the time delay between excitation pulses.

Figure 6A:
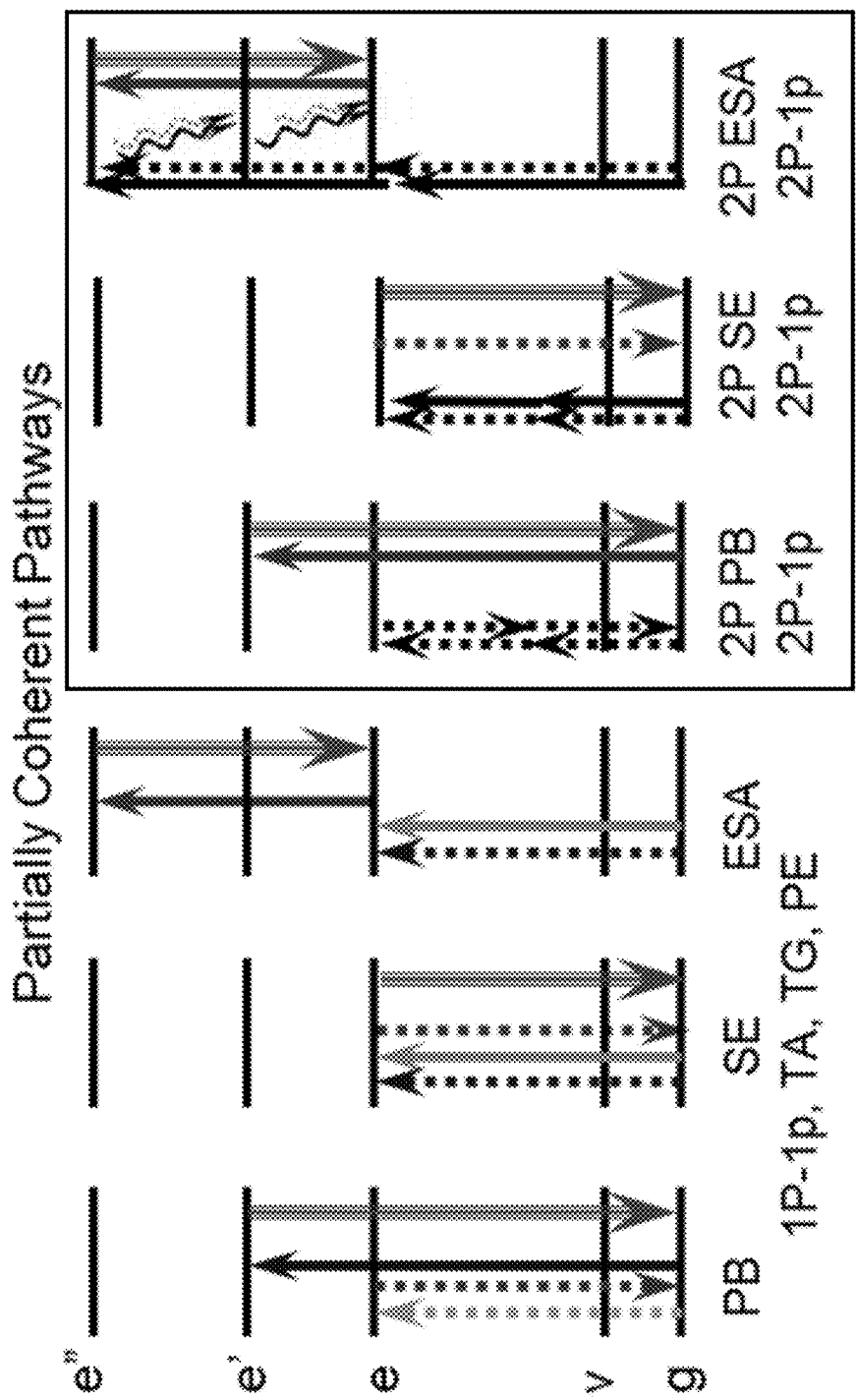
FIGS. 6A-6C illustrate a variety of coherent excitation schemes. Note that not all pathways are shown. The g, v, and e levels are ground, vibrational, and electronic states. Arrows toward the left of each scheme represent transitions which may be induced by three tunable (e.g., 1,200-34,500 $cm^{-1}$ or 124 meV-4.3 eV) and fast (e.g., 35 fs or 1 ps) light pulses.

FIG. 6A shows partially coherent pathways where the first two interactions excite populations and photo-bleach (PB) the ground state. The excited population undergoes stimulated emission (SE) or excited state absorption (ESA). These three pathways control transient absorption (TA), transient reflection (TR), transient grating (TG), and photon echo (PE). As described in the present disclosure, 2 photon pump-1 photon probe (2P-1p) analogues have been developed to avoid pump-light scattering and to probe band edge features that are directly pumped. Pump light scatter is a major problem when studying the wide variety of typical materials.

Figure 6B:
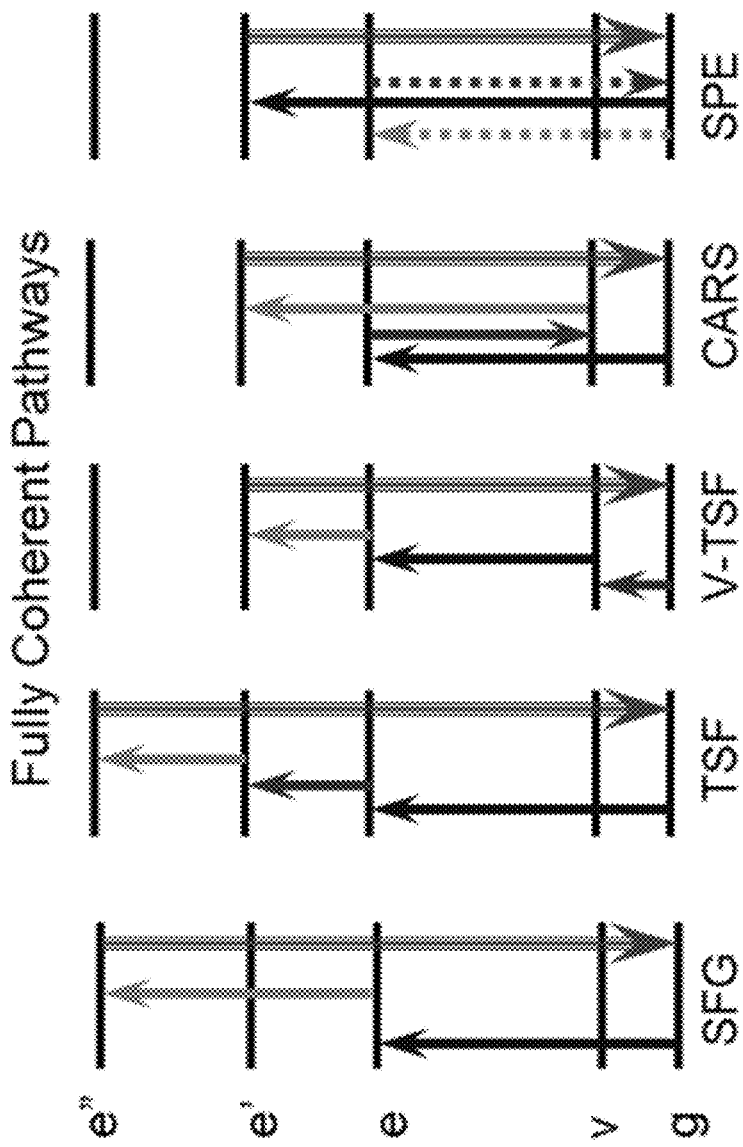

FIG. 6B shows examples of fully coherent pathways: sum frequency generation (SFG) that selectively probes interfaces, triple sum frequency (TSF), vibrationally enhanced TSF, coherent anti-Stokes Raman spectroscopy (CARS), and stimulated photon echo (SPE). They all create output frequencies that are spectrally resolved from the excitation frequencies, they act as multidimensional fingerprints that increase spectral selectivity in complex materials, and they avoid spectral changes resulting from population and relaxation dynamics.

Figure 6C:
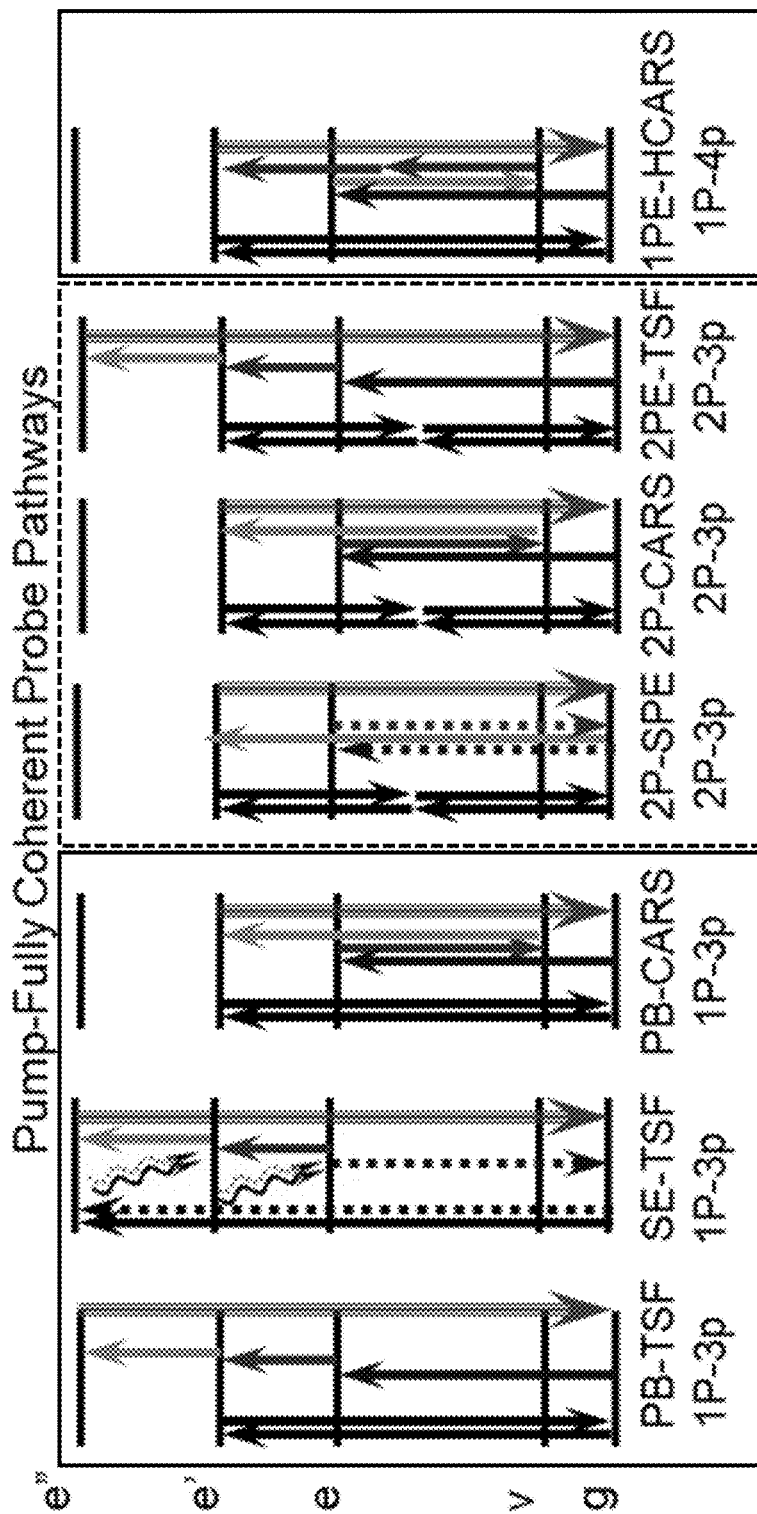

FIG. 6C shows examples of pump-fully coherent probe methods. They include the PB and SE pathways for 1 photon pump-TSF probe (1P-3p), an alternative 1P-3p pathway using the CARS pathway to access vibrational states, and 2P-3p processes using SPE or TSF as the probe. These pathways take advantage of the multidimensional spectral fingerprints that fully coherent pathways provide. They are instantaneous snap-shots of the entangled quantum states at different times during the dynamics. Importantly, although they are not sensitive to population relaxation, they do directly probe coherence transfer where quantum mechanical phase coherence is maintained during a relaxation process.

Figure 7A:
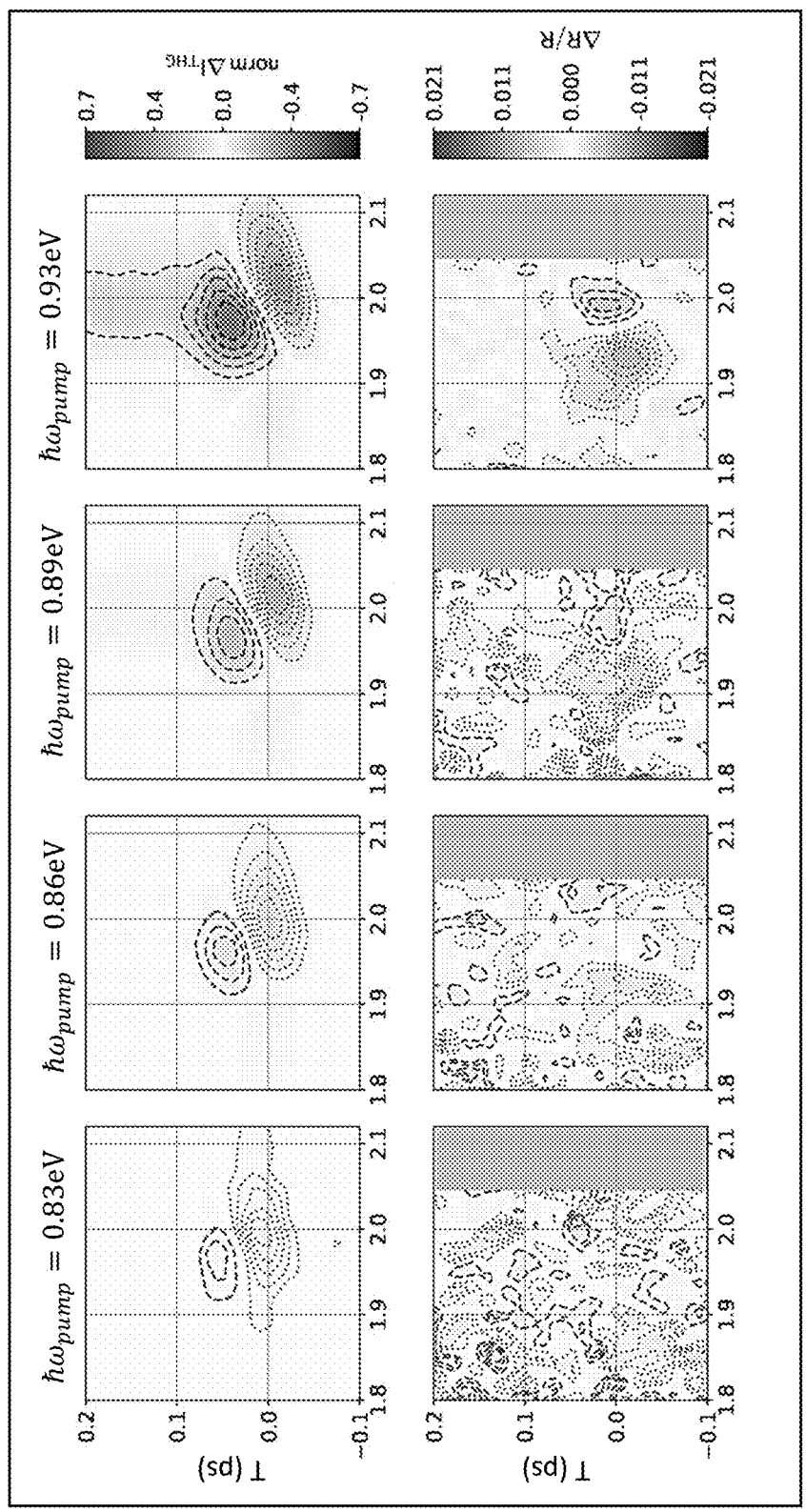
Figure 7B:
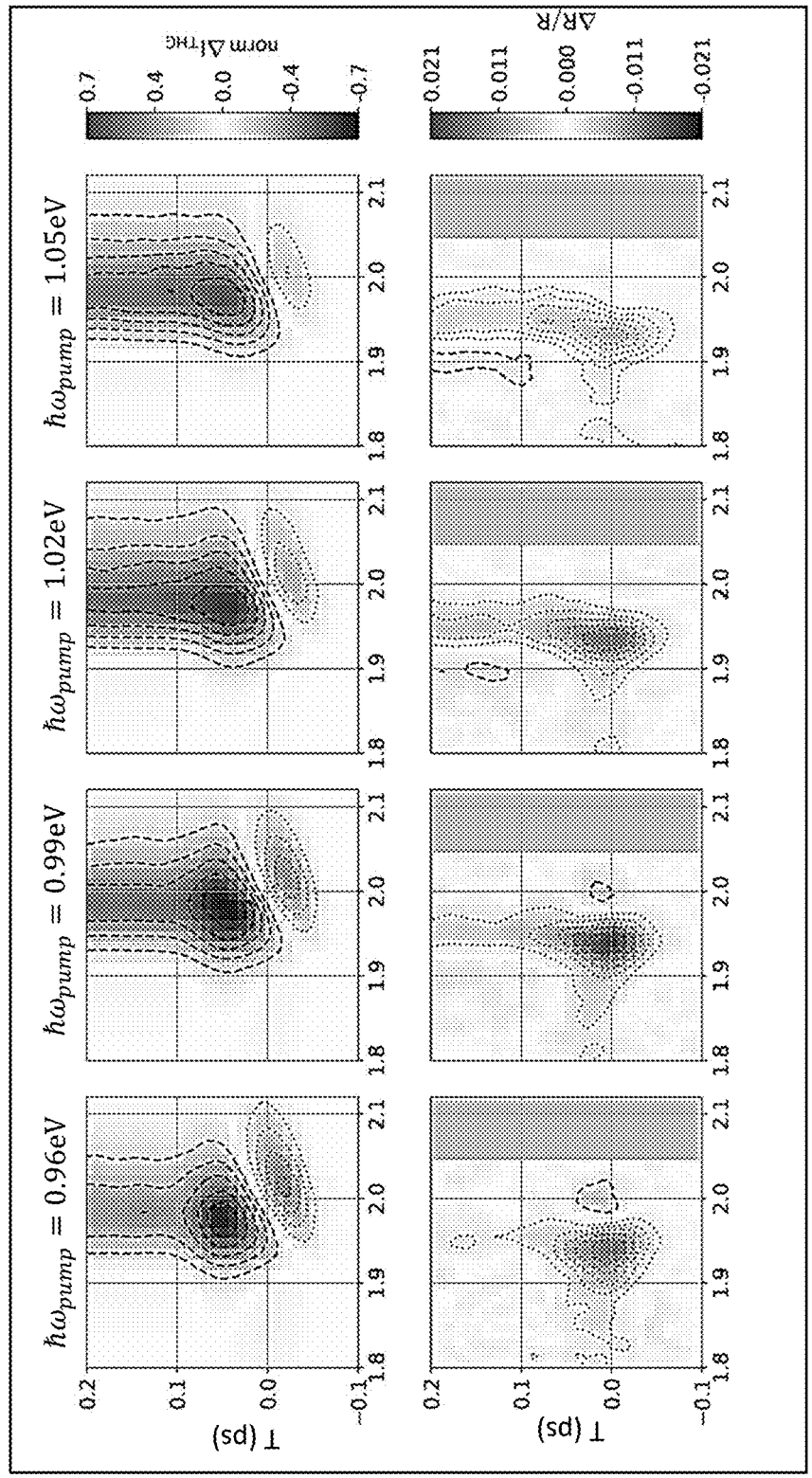

FIGS. 7A-7B compare a 2pu-3pr experiment (top row, FIGS. 7A-7B) with a 2pu-1pr experiment (bottom row, FIGS. 7A-7B) conducted on a ~100 μm wide screw-dislocation grown $WS_2$ nanostructure.

Figure 8A:
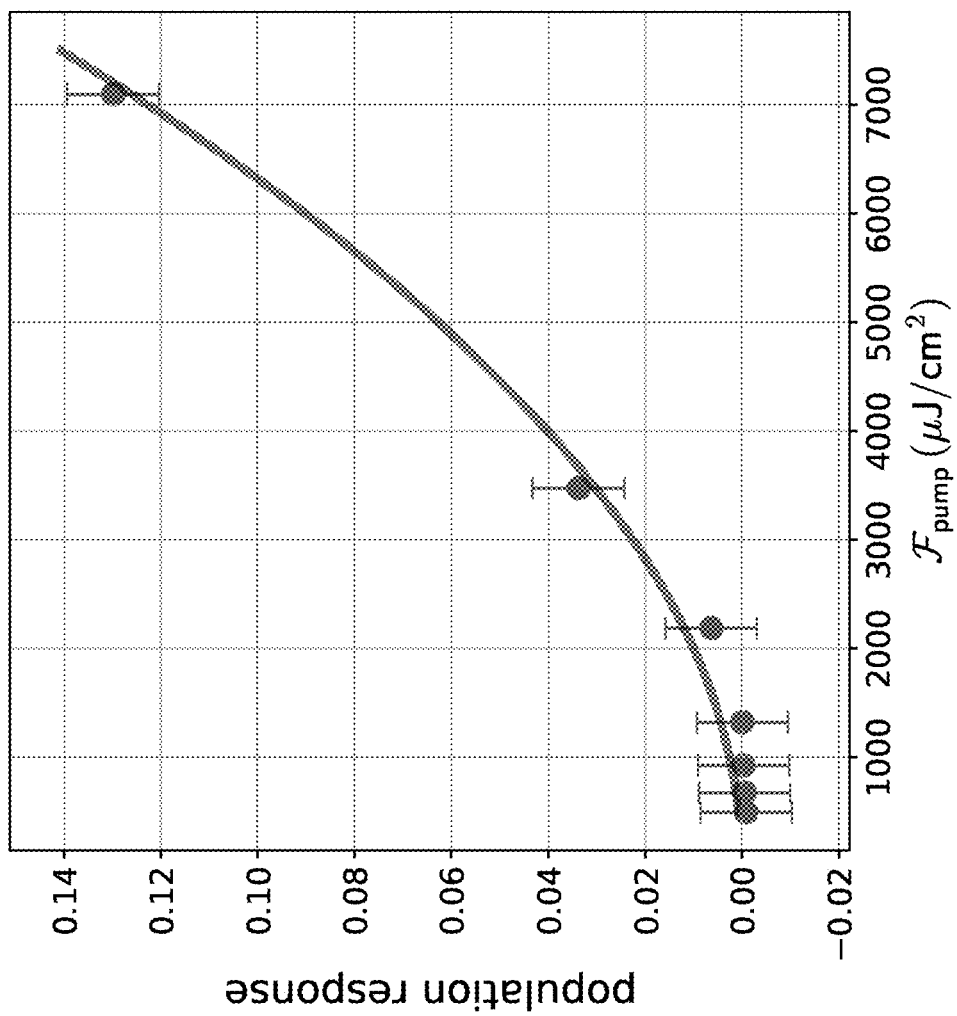
Figure 8B:
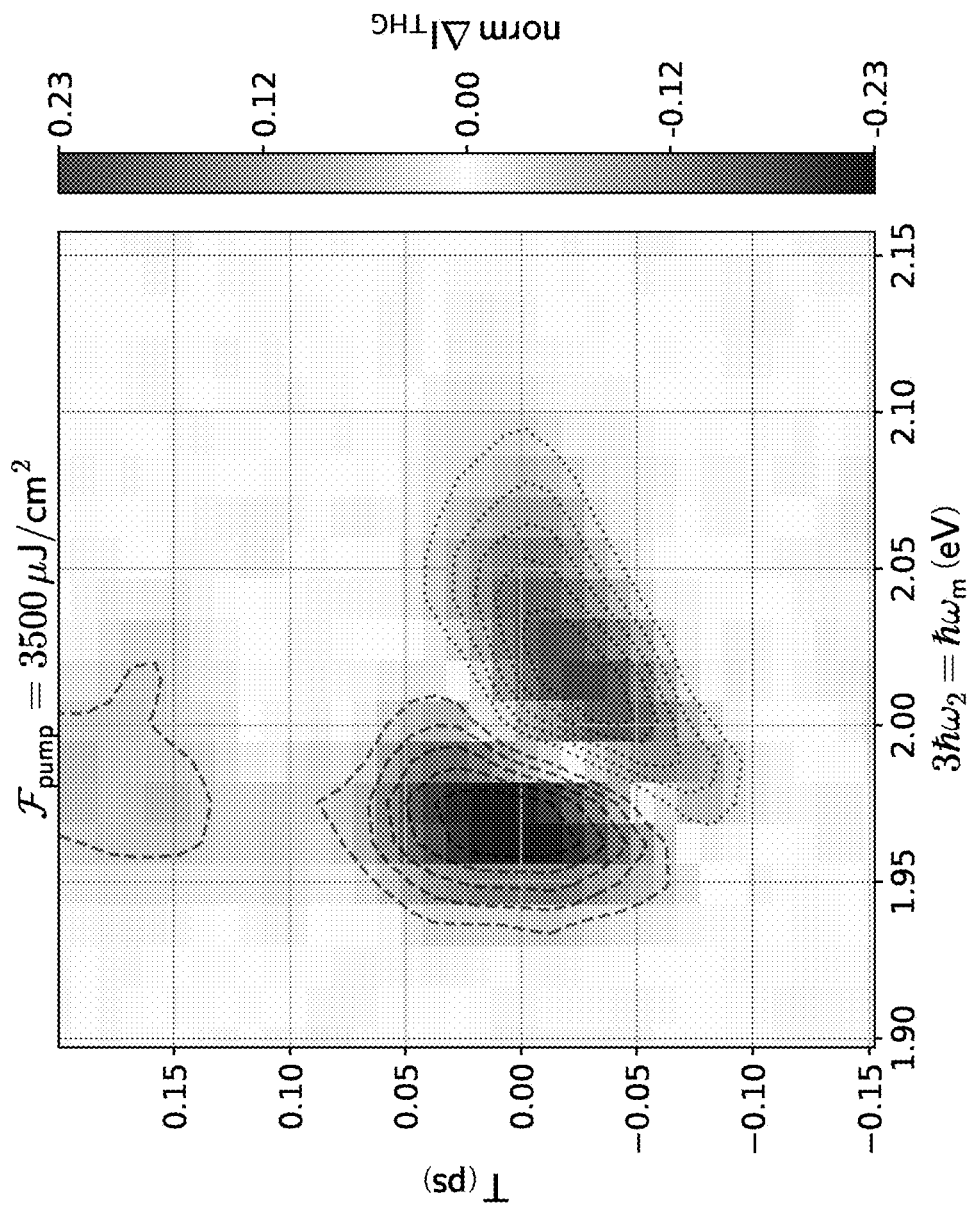

FIG. 8A shows a plot of population response versus pump fluence from a $WS_2$ monolayer film obtained using 2pu-3pr. FIG. 8B shows a representative plot of probe frequency versus pump-probe delay time from which the population response is derived.

DETAILED DESCRIPTION

The present disclosure describes new methods and systems for pump-probe spectroscopy. The present methods are based, at least in part, on the following innovations: (1) the use of a multiphoton pump configured to excite a multiphoton transition between two quantum states of a target entity in a sample or (2) the use of a multidimensional probe comprising multiple coherent light pulses to measure the nonlinear polarizability of the target entity or both (1) and (2). Use of the multiphoton pump reduces scatter, enables access to states of different symmetries than is normally possible, and enhances spatial resolution of pump-probe microscopy. Use of the multidimensional probe enhances detection limits, spatial resolution, temporal resolution, and selectivity compared to conventional methods.

In the present methods, the target entity can be a molecule, a molecular functionality (e.g., a particular chemical bond), an electron, etc., which may be present or suspected of being present in a sample. A variety of samples may be examined. By way of illustration, the present methods may be used to examine electron interactions in semiconductor samples.

Methods

Methods for pump-probe spectroscopy are provided. In an embodiment, such a method comprises directing pump light having a frequency $\omega_{pump}$ at a location in a sample, the frequency $\omega_{pump}$ selected to excite a quantum transition in a target entity in the sample and directing probe light at the location, the probe light configured to generate a coherent output signal having a frequency $\omega_{output}$ and a wavevector $k_{output}$. In the method, one or both of the following conditions apply. The first condition is that the quantum transition excited by the pump light is a multiphoton quantum transition corresponding to a frequency difference of $n^*\omega_{pump}$, wherein n≥2. However, if this condition does not apply, the quantum transition excited by the pump light is a single-photon quantum transition corresponding to a frequency difference of $\omega_{pump}$. The second condition is that the probe light is a set of m coherent light pulses, each coherent light pulse having a frequency $\omega_m$ and a wavevector $k_m$, wherein m≥2. However, if this condition does not apply, the probe light may be a single coherent light pulse having a frequency $\omega_{probe}$ and a wavevector $k_{probe}$.

In the method, the coherent output signal characterized by $\omega_{output}$, $k_{output}$ is detected as the probe light is scanned over a range of frequencies. The method may further comprise repeating the pump illumination, probe illumination, and coherent output signal detection steps at one or more different time delay (T) values between the pump light and the probe light. The method may further comprise repeating the pump illumination, probe illumination, and coherent output signal detection steps at one or more different values of the frequency $\omega_{pump}$.

Pump Light

The pump light used in the present method is a coherent light pulse characterized by the frequency $\omega_{pump}$. The frequency selected depends upon the quantum transition to be excited in the target entity, as well as whether the excitation is to be a single-photon transition (i.e., requiring the absorption of a single photon to induce the quantum transition) or a multiphoton transition (i.e., requiring the simultaneous absorption of multiple photons to induce the quantum transition). The quantum transition which is excited is a transition between two distinct quantum states of the target entity. These distinct quantum states may be discrete quantum states or virtual quantum states. These distinct quantum states may be a ground state, a vibrational state, or an electronic state. The quantum transition which is excited may be a single-quantum transition or a multiple-quantum transition.

The pump light may be configured to achieve a single-photon transition or a multiphoton transition by the appropriate selection of the frequency $\omega_{pump}$ as noted above, as well as by the appropriate selection of the intensity of the pump light. Multiphoton transitions require sufficient intensity to increase the probability of the simultaneous absorption of multiple photons by the target entity. By "simultaneous" it is meant that the time delay between the multiple photons is zero. Multiphoton transitions are distinguished from a series of pump excitations, e.g., pump-pump, in which there is a non-zero time delay between the pump photons.

FIG. 6C shows illustrative quantum transitions excited by pump light. The pump light corresponds to the first two sets of arrows (left-most) in each pathway. By way of illustration, the photobleach-triple sum frequency (PB-TSF) pathway shows pump light which excites a multiple-quantum, single-photon transition between a ground state g and a virtual electronic state e'. The two-photon stimulated photon echo (2P-SPE) pathway shows pump light which excites a multiple-quantum, two-photon transition between g-e'.

In the present method, the pump light may be fixed at the selected frequency $\omega_{pump}$, but as described above, additional steps may be carried out in the method using different values of the frequency $\omega_{pump}$. (See FIGS. 3A-3B, in which two values of $\omega_{pump}$ were used: 1.8 eV and 2 eV.) Although the pump frequencies used depend upon the target entity as noted above, pump frequencies in the infrared region (e.g., from 3 to 20 microns), those in the near-infrared region (e.g., from 0.8 to 3 microns), those in the visible region (e.g., from 0.4 to 0.8 microns), and those in the ultra-violent region (e.g., from 200 to 400 nm) of the electromagnetic spectrum may be used.

The coherent light pulses of the pump light may be characterized by a number of other properties including spectral width (~0.1-500 cm$^{-1}$) and temporal width (150 to 0.030 ps). Note that the spectral and temporal widths are inversely related. As described above, the pulse energy is selected depending upon whether single-photon or multiphoton transitions are desired. The coherent light pulses may be characterized by a repetition rate (e.g., achieved by chopping, see FIG. 2), which may be selected to be half the repetition rate of the probe light in order to analyze the difference between the coherent light output when the pump is on and off (as further described in the Example, below). The coherent light pulses of the pump light may be characterized by the orientation of its propagation axis relative to normal to the plane of the sample. The propagation axis of the pump light may be normal to the sample plane.

Probe Light

Set of m Coherent Light Pulses

In embodiments of the present method, the pump light used is a set of m coherent light pulses, each coherent light pulse having a frequency $\omega_m$ and a wavevector $k_m$, wherein m≥2. The multiple coherent light pulses interact with the target entity (e.g., an excited state population of the target entity generated by the pump light) to generate a nonlinear output polarization, which acts as the source of radiation for the coherent output signal having the frequency $\omega_{output}$ and the wavevector $k_{output}$. In general, $\omega_{output}=\Sigma\pm\omega_m$ and $k_{output}=\Sigma\pm k_m$, where specific quantum pathways are defined by specific combinations of $\omega_m$ and $k_m$. Thus, different coherent output signals each characterized by different frequencies and wave vectors and associated with different quantum pathways may be possible. Particular quantum pathway(s) may be monitored by detecting the coherent output signal(s) in the corresponding phase-matched direction(s). The detection of the desired coherent output signal and discrimination from other possible coherent output signals may be facilitated by placing a detector coincident with the desired phase-matched direction, by using certain beam geometries, and by using apertures to physically block undesired signals. In addition, altering the propagation axes of the coherent light pulses and, therefore, the propagation axis of the corresponding coherent output signal allows for different pathways to be phase-matched. Finally, detection may be accomplished in a reflective geometry, e.g., instead of placing the detector coincident with $k_{output}$, it is placed at $-k_{output}$.

FIG. 6B shows illustrative quantum pathways associated with different illustrative coherent excitation schemes using two coherent light pulses (i.e., m=2) (SFG, sum frequency generation) and three coherent light pulses (i.e., m=3) (TSF, triple sum frequency; V-TSF, vibrationally enhanced triple sum frequency; CARS, coherent anti-Stokes Raman spectroscopy; and SPE, stimulated photon echo). It is noted that not all possible quantum pathways are shown for each coherent excitation scheme. By way of illustration, the coherent output signal for the TSF quantum pathway using three coherent light pulses ($\omega_1$, $k_1$ and $\omega_2$, $k_2$ and $\omega_3$, $k_3$) is characterized by $\omega_{output}=\omega_1+\omega_2+\omega_3$ and $k_{output}=k_1+k_2+k_3$. FIG. 6B also shows that the quantum transitions excited by each coherent light pulse may be between discrete quantum states, virtual quantum states, and combinations thereof. The quantum states may be a ground state, vibrational states, or electronic states. The quantum transitions may be single-quantum transitions or multiple-quantum transitions. The quantum transitions are generally single-photon transitions, although FIG. 6C shows a quantum pathway for a HCARS excitation scheme involving a two-photon transition.

In the present method, the frequencies selected for each of the m coherent light pulses generally depend upon the desired coherent excitation scheme and the target entity. In the set of m coherent light pulses, an individual coherent light pulse may have the same frequency as another individual coherent light pulse or a different frequency. Thus, in a set of three coherent light pulses, the subscripts on $\omega_1$, $\omega_2$, and $\omega_3$ are meant only to distinguish individual, independent coherent light pulses from one another. However, in embodiments, all of the individual coherent light pulses in the set of m coherent light pulses have the same frequency. (See FIGS. 3A-3B and FIG. 4.) In embodiments, at least two individual coherent light pulses in the set of m coherent light pulses have different frequencies. (See FIGS. 5A-5B) In embodiments, all of the individual coherent light pulses in the set of m coherent light pulses have different frequencies.

Figure 5A:
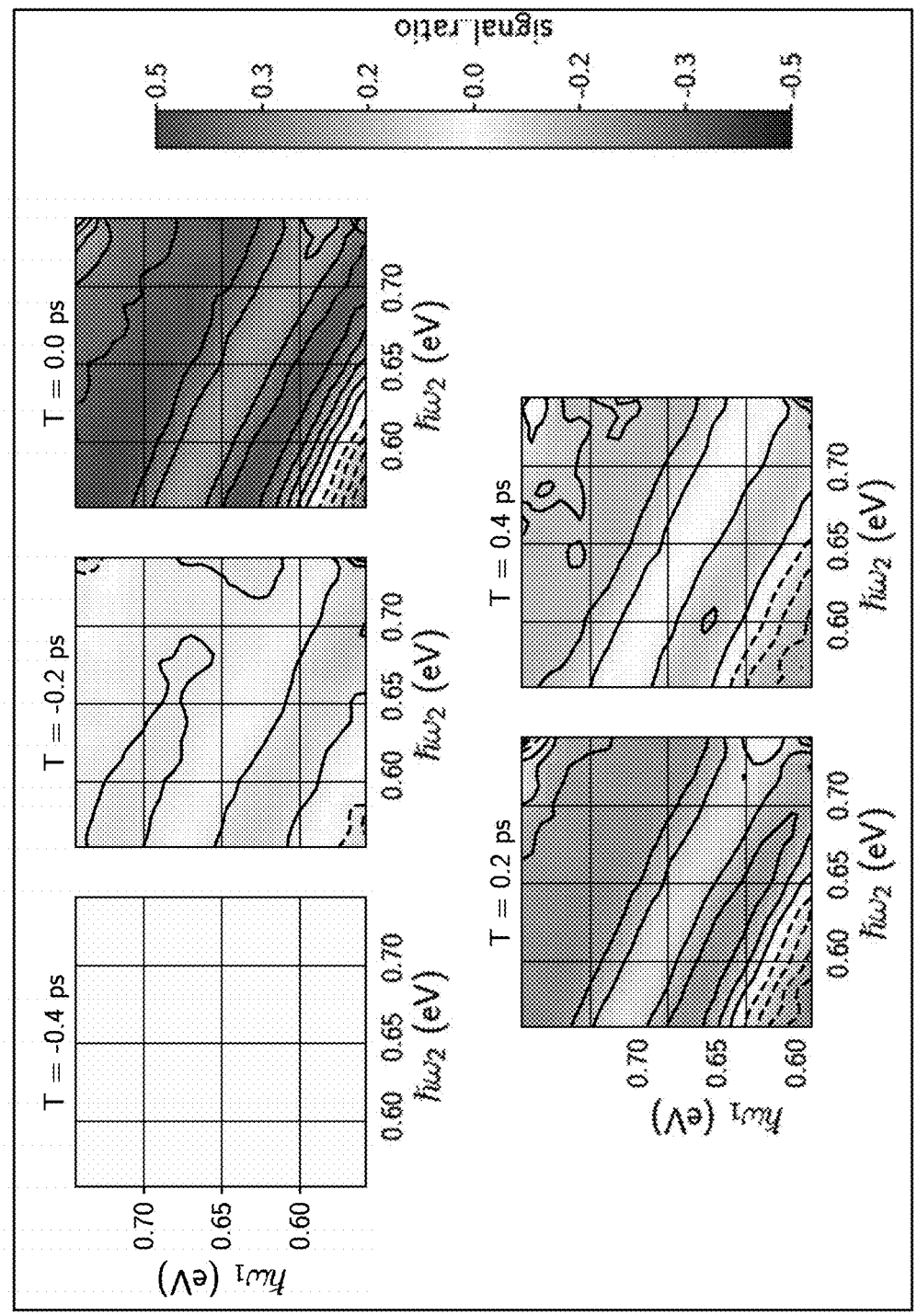
FIGS. 5A-5B show a 1pu-3pr experiment conducted on an $MoS_2$ thin film in which the probe is multidimensional, $\omega_{probe}=2\omega_1+\omega_2$. Time delay, T, between the pump and probe is notated above each subplot; time proceeds from left to right and top to bottom.
Figure 5B:
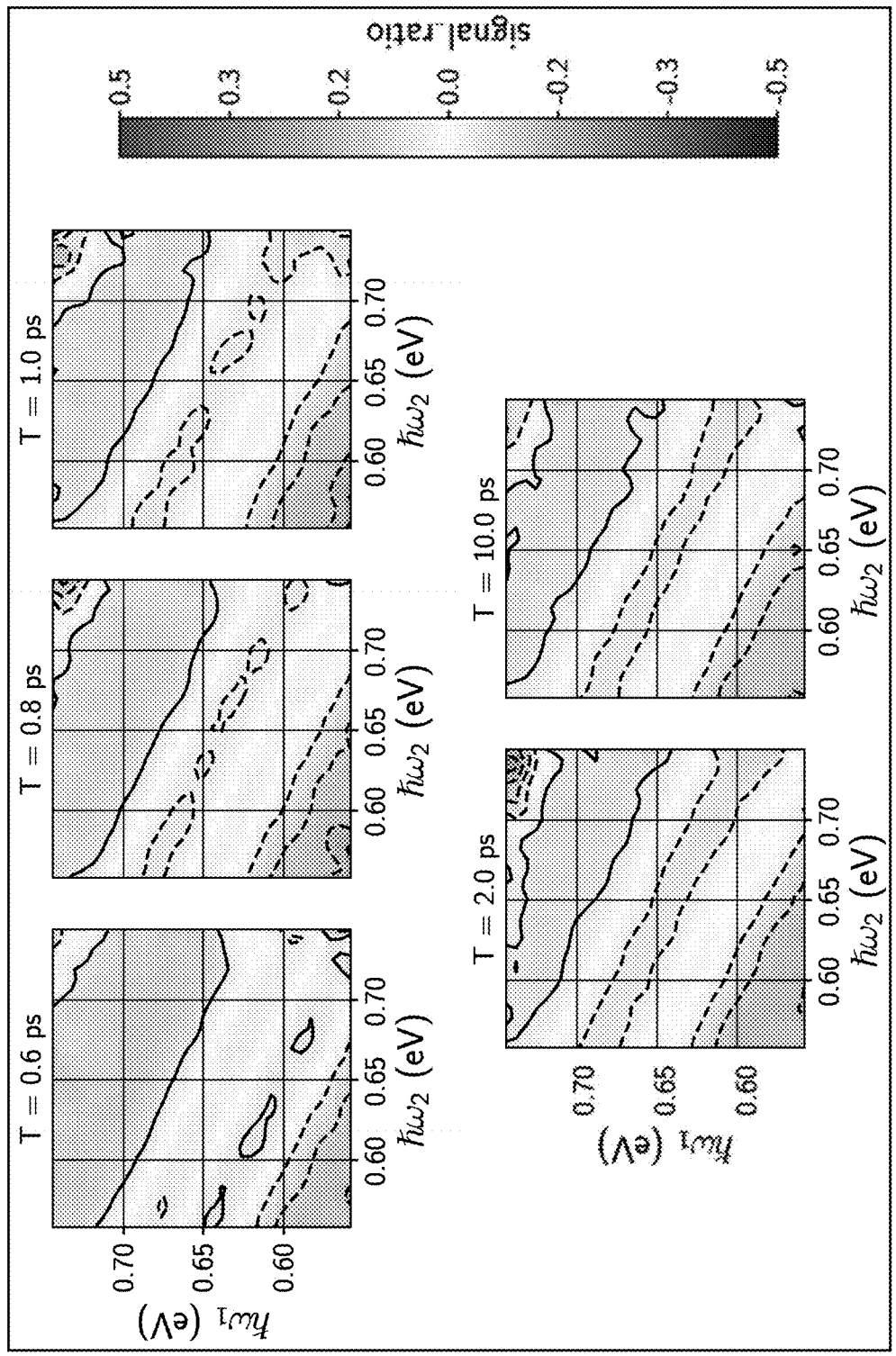

In the present method, the coherent output signal is detected as the probe light frequency changes over a range of frequencies, the range which includes the selected frequency described above. For a set of m coherent light pulses, this means that the frequencies of the coherent light pulses may be scanned together (e.g., see FIG. 3B), independently, or some combination thereof. A combination is illustrated in FIGS. 5A-5B, in which one light beam is used to provide one coherent light pulse having a frequency $\omega_1$, and another light beam is used to provide a second and third coherent light pulse each having the same frequency $\omega_2$. The coherent output signal $\omega_{output}=\omega_1+2\omega_2$ and $k_{output}=k_1+2k_2$ is detected (or $-k_{output}$ is detected in a reflective geometry) as the frequencies of two of the coherent light pulses are scanned together while the frequency of the other coherent light pulse is independently scanned.

Although the frequencies used for each of the m coherent light pulses depend upon the desired coherent excitation scheme and the target entity, frequencies in the infrared region (e.g., from 3 to 20 microns), those in the near-infrared region (e.g., from 0.8 to 3 microns), those in the visible region (e.g., from 0.4 to 0.8 microns), and those in the ultra-violent region (e.g., from 200 to 400 nm) of the electromagnetic spectrum may be used.

The m coherent light pulses may be characterized by the time delays between individual coherent light pulses. By way of illustration, time delays may be defined relative to a first coherent light pulse such that $\tau_{21}=\tau_2-\tau_1$ and $\tau_{31}=\tau_3-\tau_1$. The time delays determine the order in which the coherent light pulses interact with the target entity, and in general, any order may be used. In embodiments, the m coherent light pulses are temporally overlapped, i.e., the time delay between individual coherent light pulses is zero. The time delays between individual coherent light pulses may be fixed. Alternatively, the time delays may be scanned over a range of time delays, or additional steps may be carried out in the method using different values of the time delays.

The m coherent light pulses may be each characterized by a number of other properties including spectral width (~0.1-500 cm$^{-1}$) and temporal width (150 to 0.030 ps), which are generally selected based upon the desired coherent excitation scheme. The m coherent light pulses may be each characterized by pulse energy (~$10^{-2}$ to $10^{-9}$ joules), which is generally selected to provide sufficient intensity to ensure nonlinear interactions with the target entity. The m coherent light pulses may be each characterized by a repetition rate (~10 to $10^8$ Hz) (e.g., achieved by chopping, see FIG. 2), which is generally selected to provide a desired data acquisition speed. Note that the pulse energy and repetition rate choices are inversely correlated. Each of the m coherent light pulses may be characterized by the orientation of its propagation axis relative to the normal to the plane of the sample. For example, a coherent light pulse may have a propagation axis which is normal to the sample plane. Alternatively, a coherent light pulse may have a propagation axis which forms an angle $\theta$ relative to normal. The m coherent light pulses may be configured in a non-collinear beam geometry in which different coherent light pulses are characterized by different propagation axes.

Single Coherent Light Pulses

In embodiments of the present method, the probe light used is a single coherent light pulse having the frequency $\omega_{probe}$ and the wavevector $k_{probe}$. When a single coherent light pulse is used, it interacts with the target entity (e.g., an excited state population of the target entity generated by the pump light) to generate a nonlinear output polarization, which acts as the source of radiation for the coherent output signal having the frequency $\omega_{output}$ and the wavevector $k_{output}$, wherein $\omega_{output}=\omega_{probe}$ and $k_{output}=k_{probe}$.

As described above for the set of m coherent light pulses, the frequency $\omega_{probe}$ selected generally depends upon the target entity and frequencies in the infrared, near-infrared, visible, and ultra-violet regions of the electromagnetic spectrum may be used. Similarly, when using a single coherent light pulse as the probe light, the coherent output signal is detected as the probe light changes over a range of frequencies, the range which includes the selected frequency.

Single coherent light pulses having relatively narrow spectral widths (and associated, inversely proportional temporal widths) and relatively high intensities may be used as described above with respect to the individual coherent light pulses in the set of m coherent light pulses. The characterization/selection of repetition rate and propagation orientation is analogous to that described above for the set of m coherent light pulses.

In the present methods, the pump light (whether configured to achieve a single-photon quantum transition or a multiphoton quantum transition) and the probe light (whether as a set of m coherent light pulses or a single coherent light pulse) are spatially overlapped at the location in the sample. The overlap may be a complete overlap so that the centers of each illumination spot are coincident or a partial overlap. Partial overlap is useful to allow for the spatial region of the sample being illuminated to be smaller than the smallest diffraction limited spot size.

Similarly, regardless of the particular configuration of the pump light and the probe light, a time delay T defines the time delay between the arrival of the pump light and the arrival of the probe light at the location in the sample. The time delay T may be defined relative to the pump light. The time delay T may be fixed at a particular value (see FIG. 4), but as described above, additional steps may be carried out in the method using different values of the time delay T. (See FIGS. 3A-3B and FIGS. 5A-5B.)

Illustrative quantum pathways which may be analyzed using the present methods are shown in FIG. 6A (boxed region) and FIG. 6C. The boxed region of FIG. 6A illustrates quantum pathways which may be analyzed using the present method, wherein the pump light is configured to excite a multiphoton quantum transition and the probe light is a single coherent light pulse (i.e., various 2P-1p pathways). The solid boxed regions of FIG. 6C illustrate quantum pathways which may be analyzed using the present method, wherein the pump light is configured to excite a single-photon quantum transition and the probe light is a set of 3 coherent light pulses (i.e., various 1P-3p pathways) or a set of 4 coherent light pulses (i.e., a 1P-4p pathway). The dashed boxed region of FIG. 6C illustrates quantum pathways which may be analyzed using the present method, wherein the pump light is configured to excite a multiphoton quantum transition and the probe light is a set of 3 coherent light pulses (i.e., various 2P-3p pathways). See also FIG. 1B for a schematic of a 1P-3p quantum pathway, FIG. 1C for a schematic of a 2P-1p quantum pathway, and FIG. 1D for a schematic of a 2P-3p quantum pathway. FIGS. 3A-3B, 4, and 5A-5B present results of analyzing these quantum pathways in an MoS$_2$ semiconductor film using the present method. These results have been referenced above and are further described in the Example, below.

Systems

Figure 2:
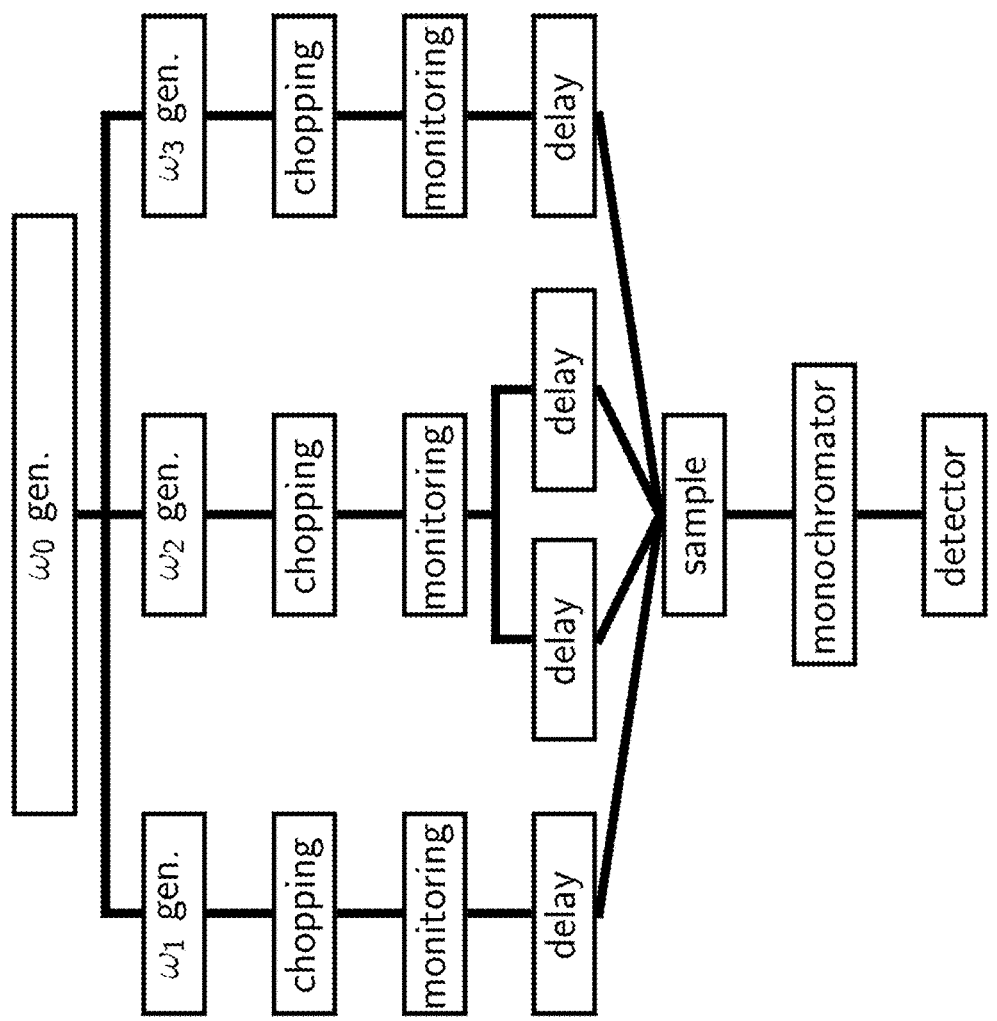
FIG. 2 is a block diagram showing an illustrative system for carrying out the disclosed pump-probe spectroscopic methods. This figure also illustrates the experimental setup for the experiments conducted in the Example, below. The direction of propagation of laser beams flows from top to bottom. Different colors of lasers are created from the same source. The new lasers are chopped, time delayed by mechanical translation stages, and focused to the same spot on a sample. A new beam of light is created in the sample. The new beam is isolated spectrally and spatially and finally detected. Multidimensional experiments are accomplished by changing the colors, time delays, and fluences of the lasers overlapped at the sample. Different types of experiments are adjudicated by isolating a certain output process and using carefully selected color combinations of input electric fields.

Systems for carrying out the present methods are also provided. An illustrative system is shown in FIG. 2. The systems may include a microscope, including a confocal microscope. In general, the microscope comprises optics configured to receive the pump light and the probe light from light sources and to direct the pump/probe light into a sample. These optics may include optics configured to direct the pump/probe light along desired propagation axes to achieve a desired beam geometry and optics (e.g., an objective lens) configured to focus the pump/probe light into the sample. The microscope also comprises a stage configured to support the sample and a detector (e.g., a photomultiplier tube) configured to receive and to detect a coherent output signal generated from the sample.

The system may comprise a variety of other components. The system may comprise the light sources (and associated optics) configured to generate coherent light pulses having certain of the characteristics described herein (e.g., frequency, spectral width, temporal width, pulse energy). The system may comprise optics configured to adjust the time delay between the coherent light pulses. The system may comprise choppers configured to achieve desired repetition rates for the pump/probe light. The system may comprise optics configured to receive light generated from the sample or passing through the sample and to direct the light towards a detector, including optics configured to focus or collimate the light. The system may comprise an aperture configured to receive light generated from the sample or passing through the sample and to block undesired light (e.g., certain coherent excitation pulses or undesired coherent output signals). This or another aperture may also be configured to block light generated from regions within the sample which are outside the focus region, although such apertures may not be necessary. The system may comprise optical filters configured to receive light generated from the sample or passing through the sample and to block undesired light (e.g., certain coherent excitation pulses). Monochromators may also be used for this purpose. The system may further comprise components for controlling certain operations of the microscope, e.g., a processor and a computer-readable medium operably coupled to the processor, the computer-readable medium having computer-readable instructions stored thereon that, when executed by the processor, cause the scanning microscope to perform certain operations for controlling the microscope.

Scanning microscopes may also be used so that various locations in the sample may be analyzed. Scanning may be achieved by scanning the pump/probe light relative to the sample, e.g., via scanning optics in the scanning microscope, or by scanning the sample relative to the pump/probe, e.g., via a scanning stage. In the former case, the scanning optics typically control the x and y position of the pump/probe relative to the sample. The z position may be controlled by adjusting the position of the objective lens relative to the sample. The scanning optics for scanning the pump/probe light relative to the sample may include galvano scanners, e.g., such as those available on the Nikon A1 MP confocal microscope available from Nikon Instruments, Inc. The spatial resolution that is possible in the scanning microscope is determined by the diffraction limited spot size of the highest frequency of the coherent light pulses and the coherent output signal.

EXAMPLE

Introduction

Light interacts with matter as defined by Maxwell's equations. In these equations an electric field, E, can drive an oscillating material polarization, P, which can then drive a new electric field. Traditionally, P is written as an expansion in powers of E:

$$P = \epsilon_0(\chi^{(1)}E + \chi^{(2)}E^2 + \chi^{(3)}E^3 + \ldots)$$

in which the tensorial nature of all terms has been neglected. The absorptivity and reflectivity of a system are encoded in $\chi^{(1)}$. Second harmonic and third harmonic generation (SHG and THG, respectively) efficiency are encoded in $\chi^{(2)}$ and $\chi^{(3)}$, respectively. The ability of an optical pump to change a sample's absorption or reflection spectrum is also encoded in $\chi^{(3)}$. Ultrafast measurements typically interrogate $\chi^{(3)}$. In this Example, many different orders of $\chi$ were interrogated by using multiple photon pumps and probes.

When a single electric field interacts with a system, it drives a coherence in which the system is oscillating between two states with a frequency defined by the energy difference between the states. This coherence is a quantum mechanical superposition of states ($\psi$) with weighting-factors c:

$$\Psi = c_0\psi_0 + c_1\psi_1$$

in which "0" and "1" are arbitrary state labels.

In Dirac bra ket notation, the interaction with an electric field can be written as:

$$|0\rangle\langle 0| \rightarrow |1\rangle\langle 0|$$

in which $|1\rangle\langle 0|$ is the newly created coherence. If another electric field interacts with the coherence before it decays, three pathways can be traversed:

$$|1\rangle\langle 0| \rightarrow |0\rangle\langle 0|$$

$$|1\rangle\langle 0| \rightarrow |1\rangle\langle 1|$$

$$|1\rangle\langle 0| \rightarrow |2\rangle\langle 0|.$$

These pathways detail returning to the starting state, creating an excited population, and creating a double quantum coherence, respectively. As noted earlier, coherences oscillate at their state's frequency difference; the notated pathways result in coherences with frequency differences of $\omega_{00}=0$, $\omega_{11}=0$, and $\omega_{20}$. It is apparent that the first two coherences have been driven to be non-oscillating populations by the second electric field interaction, while the last pathway results in a state which oscillates at a different frequency than it started at. Two interactions with electric fields are required to drive a system to a population. In common parlance, one photon can create a population. Also, in common parlance, two photons are required to drive a $|2\rangle\langle 0|$ coherence which can then emit light and accomplish "second harmonic generation" (SHG). Conversely, as evidenced earlier, an excited state, $|1\rangle\langle 1|$, and a double quantum coherence, $|2\rangle\langle 0|$, were caused by the same number of electric field interactions. Thusly, common parlance and the present wave-mixing approach differ in nomenclature for counting interaction numbers: phased electric field interactions vs. quantized photons.

A New Family of Pump-Probe Spectroscopies

FIGS. 1A-1D show four wave-mixing energy-level (WMEL) diagrams for individual spectroscopic methods. Note, only the "excited state absorption" (ESA) pathway is shown for each method—other pathways are present. The transitions are time-ordered from left to right. Each arrow is a sequential excitation of a multiple quantum coherence (MQC). Pairs of coupled states (i and j) within the MQC oscillate at their difference frequency, $\omega_{ij}$, and launch their own electromagnetic fields represented by the final downward arrow. The sequences of solid and dotted arrows denote the pathways that excite the i and j states, respectively.

Each WMEL shows a population of state $|1\rangle$ created by the pump field. The probe then creates a coherence between states $|1\rangle$ and $|2\rangle$; this coherence emits at the states' frequency difference, $\omega_{21}$. The key difference between the experiments shown is how the initial population is created and then how it is probed.

Figure 1:
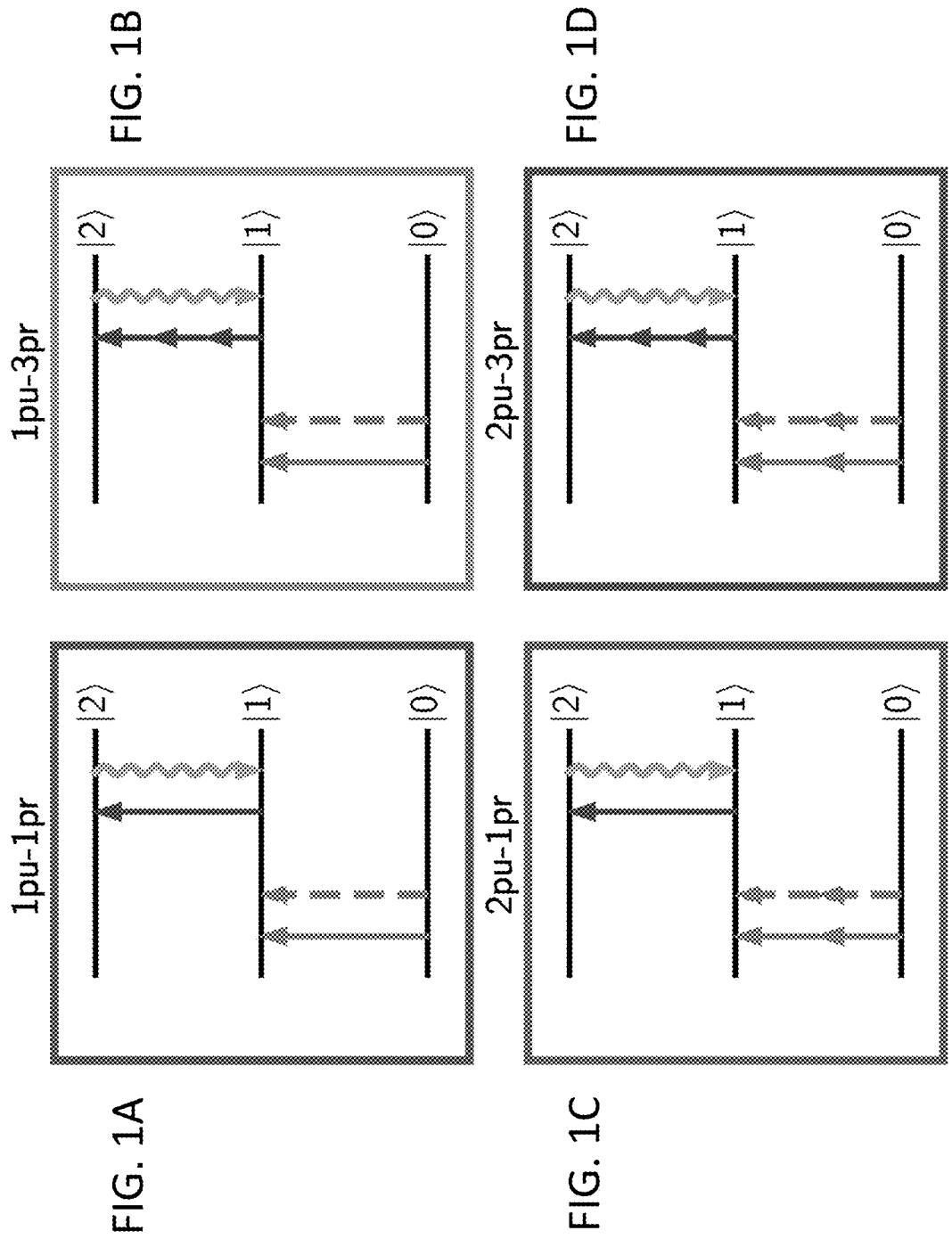
FIGS. 1A-1D show four different but complementary pump-probe spectroscopies.

In FIG. 1A (1pu-1pr, i.e., 1pump-1probe), the population is created with two electric field interactions of opposite phase (one photon total) and probed with one electric field interaction with an output of the opposite phase. In the present case, the one photon probe is accomplished in the reflective direction, so "transient reflection" spectroscopy is being performed.

In FIG. 1B (1pu-3pr, i.e., 1pump-3probe), the population is created with two electric field interactions of opposite phase (one photon total) and probed with three electric field interactions. The electric field interactions can come from the same beam or different beams, or even beams of different colors. In the present experiments, a TSF (triple-sum frequency) probe is used in which two beams of different colors are used to drive the output coherence (one beam interacts with the sample twice). A THG (triple-harmonic generation) probe is also used in which two beams of the same color drive the output coherence (again, one beam interacts with the sample twice).

In FIG. 1C (2pu-1pr, i.e., 2pump-1probe), the population is created with two pairs of electric field interactions (four field interactions for a total of two photons) and probed, as above, with one electric field interaction.

In FIG. 1D (2pu-3pr, i.e., 2pump-3probe), the population is created with two pairs of electric field interactions and probed, as above, with three electric field interactions.

Pump-TSF-Probe

In this Example, TSF spectroscopy is used as a multidimensional probe. TSF is the non-degenerate analog of THG and the four-wave mixing extension of three-wave mixing processes like sum-frequency generation (SFG) and SHG. TSF uses independently tunable ultrafast pulses to coherently excite states in a ladder-climbing style. Changing the multiple input pulse frequencies enables collection of a multidimensional spectrum. Cross peaks in the spectrum identify the dipole coupling between states. TSF has previously studied vibrational and electronic states of molecules. TSF has also studied an $MoS_2$ thin film. For additional description of TSF, see U.S. Pat. No. 9,267,893, which is hereby incorporated by reference in its entirety.

The TSF spectrum of a semiconductor may be acquired in a two-beam, reflective geometry. Two electric fields $E_1$ and $E_2$ with frequencies $\omega_1$ and $\omega_2$ and wave vectors $\vec{K}_1$ and $\vec{K}_2$ drive a polarization which emits a new electric field with wave vector $-(\vec{K}_1+2\vec{K}_2)$ (the negative signs correspond to the reflective direction) and frequency $\omega_\Sigma=\omega_1+2\omega_2$. It is noted that the fact that TSF is not phase-matchable over long sample lengths is not a problem if the experiment is accomplished in a reflective geometry. The temporally and spatially coherent newly emitted TSF field is spatially isolated, filtered with a monochromator or bandpass filters, and finally measured (generally with a photomultiplier tube; homodyne detection).

In this Example, a pump step is added by optically exciting a sample with an intense pump, $E_{pump}$, probing with a multi-beam TSF probe, and then chopping the pump to see how the presence of the pump changes the TSF spectrum. This algorithm is analogous to how pump-probe, TA, and TR datasets are collected. In the conventional methodologies, the pumped signal interferes with an unperturbed reflected or transmitted beam at the detector; this process is called self-heterodyne detection. The relative phases of the perturbed and unperturbed beams are locked. In pump-TSF-probe, the pumped-TSF signal ($\chi^{(5)}$) interferes with unperturbed TSF ($\chi^{(3)}$) at the detector. The relative phases of TSF and pumped-TSF are not guaranteed to be locked together.

Description of Experiment

FIG. 2 is a block diagram of the system used to perform the experiments conducted in this Example. An ultrafast oscillator seeds a regenerative amplifier which creates ultrafast pulses (~40 fs) centered at 1.55 eV (800 nm) with a 1 kHz repetition rate. These pulses pump commercial optical parametric amplifiers (OPAs). The OPAs and their associated mixing stages can generate tunable pulses of light spanning the visible and near IR frequency ranges. One of the OPAs has its output further split, thus three beams are present on the laser table with frequencies $\omega_1$, $\omega_2$, and $\omega_3$ and wave vectors $\vec{K}_1$, $\vec{K}_2$, and $\vec{K}_3$, respectively. Residual light from the regenerative amplifier is also used as a fourth beam. The desired experiment (i.e., coherent excitation scheme, see FIGS. 1A-1D) dictates which beam lines and colors are in use for a given experiment. The beams are focused onto the sample. The spatially and temporally coherent output from the sample is spatially isolated in (generally) the reflected direction with an aperture, focused into a monochromator, and detected. Motorized retro-reflectors control the relative arrival time of all pulses at the sample position. It is noted that the dispersion of transmissive optics in the beam paths makes the beams' time-of-flight color-dependent. This color-dependent time-of-flight is actively corrected by offsetting the arrival time setpoint for each possible color combination. The offset is empirically defined by maximizing TSF signal and is loaded into the acquisition software. The beams are chopped using commercial optical choppers in order to isolate the desired signal. The acquisition software, which controls all motors and records data, is open source (MIT License), written in Python, and available on GitHub.

There are many different ways to define the useful "signal" outputs of these experiments. One way is a difference between pumped and not pumped probe intensity:

$$signal_{diff} \equiv I_{pump\ on} - I_{pump\ off}$$

in which 1 refers to the measured probe intensity. signal_diff suffers from different probe intensities not being represented equally. This is especially problematic when using driving electric fields with non-uniform intensities across their dynamic range and when the probe intensity is greatly increased on resonance (as it is for reflective and TSF probes). One simple solution is to divide signal_diff by the unpumped probe intensity:

$$signal_{ratio} \equiv \frac{I_{pump\ on} - I_{pump\ off}}{I_{pump\ off}}.$$

This is the solution used in this Example; however, it is noted that this metric can yield unintuitive results when the un-pumped and pumped probe do not have a fixed phase relationship for all probe frequencies.

Brief Introduction to MoS₂'s Optical Properties

In this Example, a polycrystalline $MoS_2$ thin film is investigated. Transition metal dichalcogenides (TMDCs), such as $MoS_2$, are layered semiconductors whose indirect bandgaps become direct in the monolayer limit. TMDCs exhibit strong spin-orbit coupling and high charge mobility, and they have novel photonic capabilities. The optical spectrum of $MoS_2$ is dominated by three features: A ($\hbar\omega \approx 1.8$ eV), B ($\hbar\omega \approx 1.95$ eV), and C ($\hbar\omega \approx 2.7$ eV). A and B originate from high binding energy excitonic transitions between spin-orbit split bands. The stronger C feature is predicted to arise from a large joint density of states (JDOS) due to band nesting across a large section of the Brillouin zone (BZ).

Representative Data

Figure 3A:
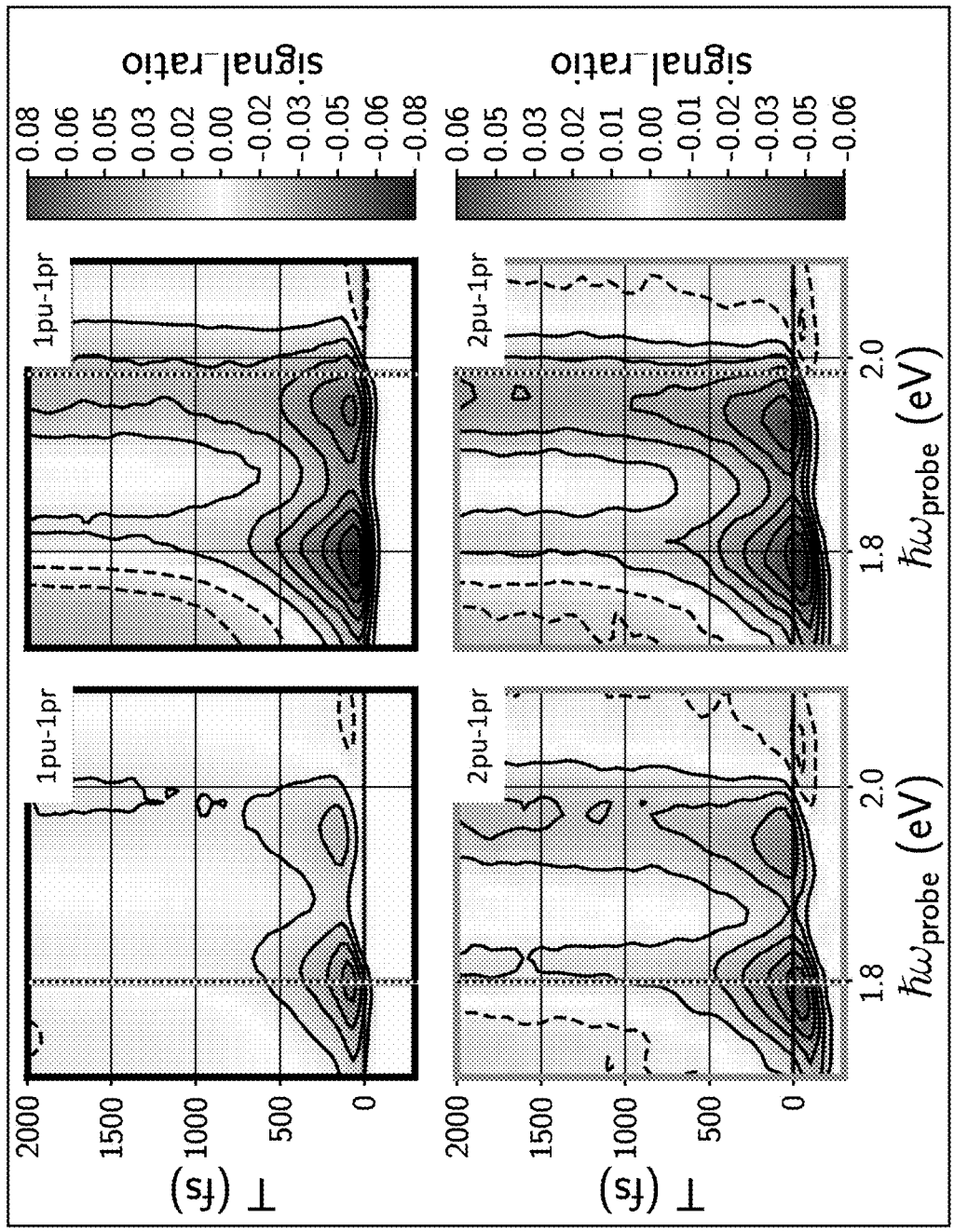
FIGS. 3A-3B show the frequency vs. time multidimensional experiments conducted on an $MoS_2$ thin film using the four different pump-probe spectroscopies shown in FIGS. 1A-1D. T is time delay between pump(s) and probe(s). Dashed, vertical lines indicate the pump energy (twice the pump energy for 2pu experiments). Two pump energies were used. A variety of pump and probe fluences were used in acquiring the different datasets. The y-axis of FIG. 3B is the same as that shown in FIG. 3A.
Figure 3B:
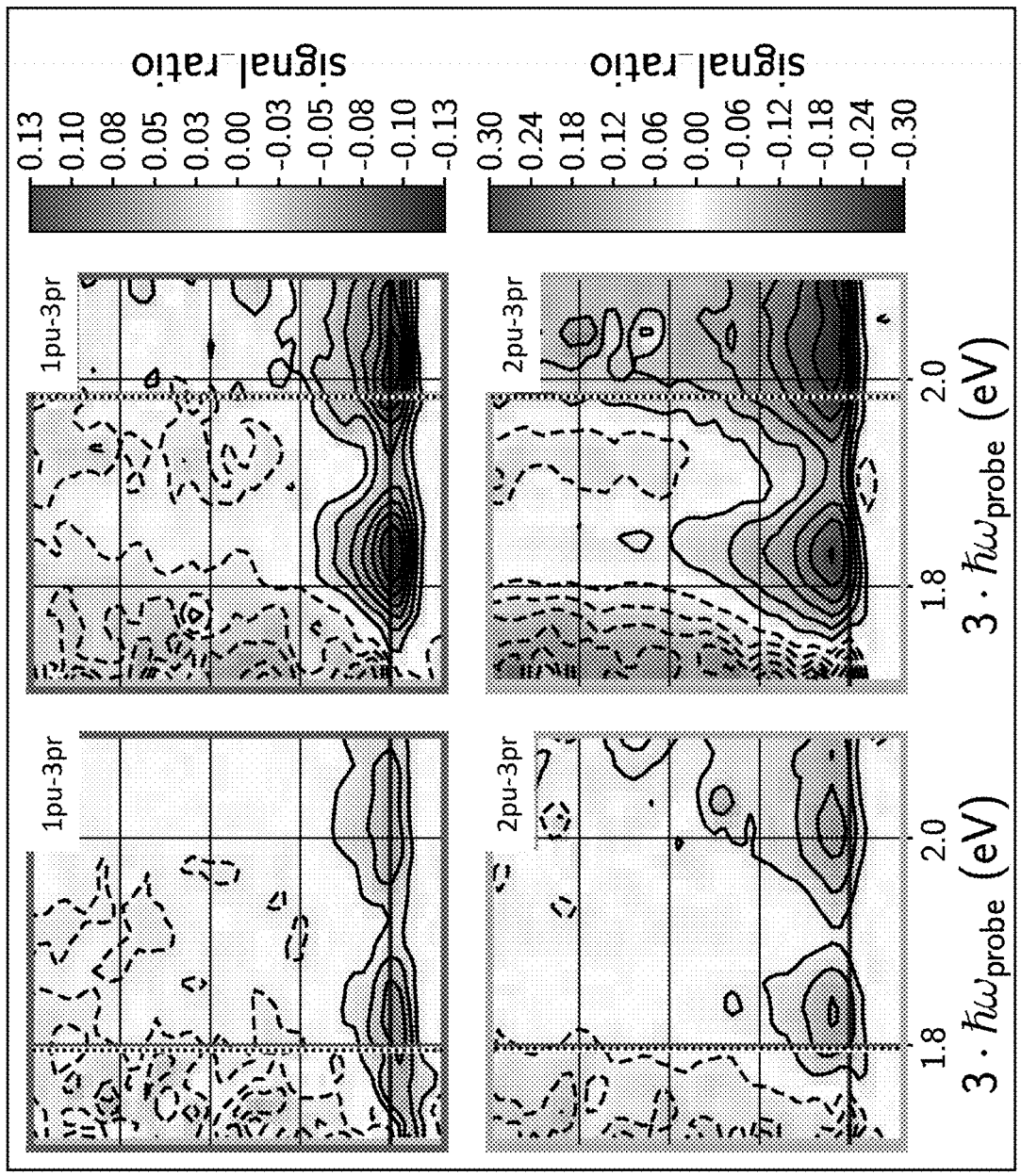
Figure 4:
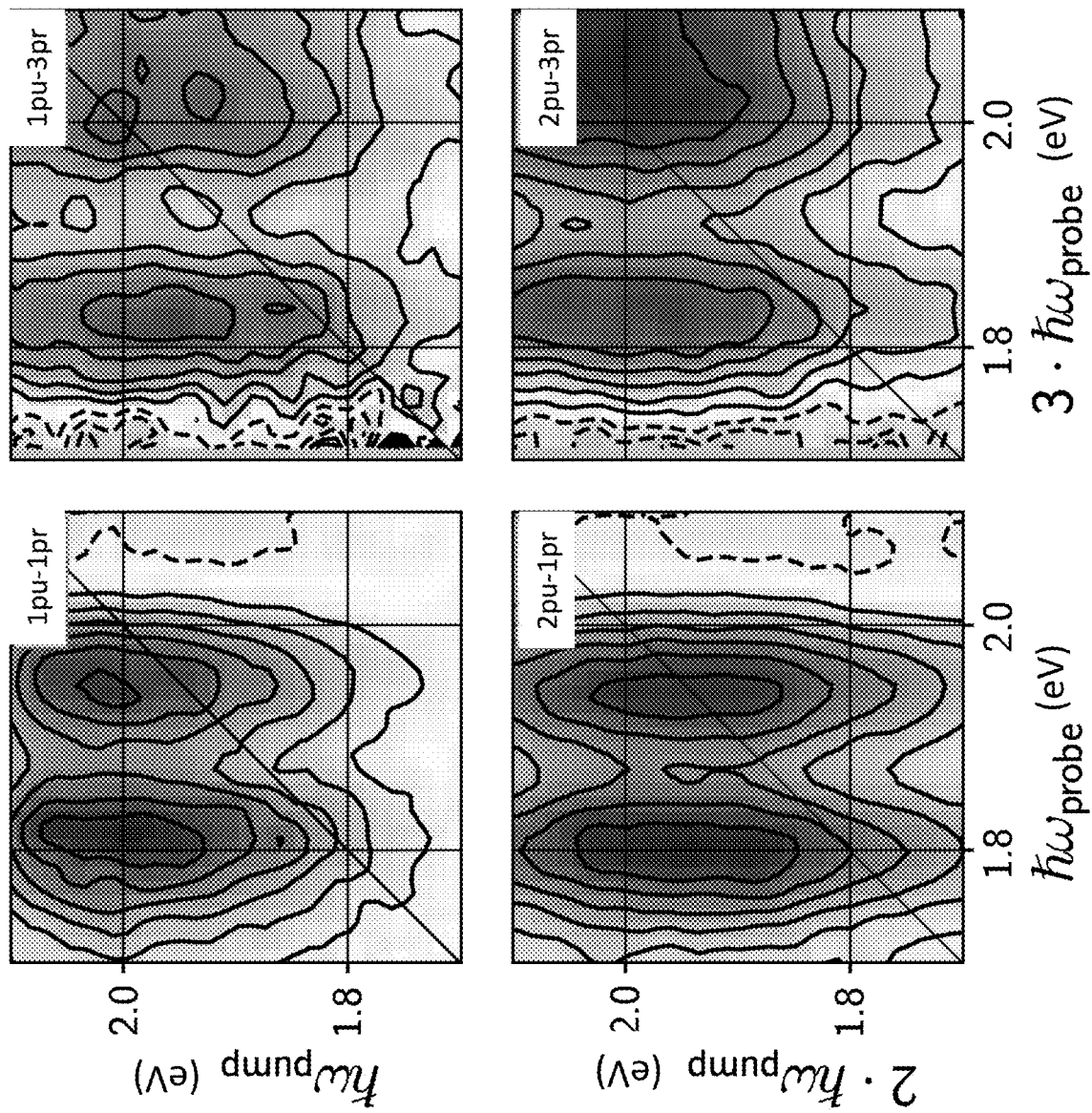
FIG. 4 shows the frequency vs. frequency multidimensional experiments conducted on an $MoS_2$ thin film using the four different pump-probe spectroscopies shown in FIGS. 1A-1D. The time delay between the pump and probe is T≈100 fs. A variety of pump and probe fluences were used in acquiring the different datasets. The solid contour lines correspond to decreased probe intensity when pumped, while dashed contour lines correspond to increased probe intensity when pumped. The relative intensity of the grayscale colormap is not shared across subplots.

Enclosed are representative datasets which demonstrate the ability to do multiphoton pump and probe spectroscopies. FIGS. 3A-3B compare the conventional method, transient reflectance (1pu-1pr), with the new methods: single-photon pump-TSF-probe (1pu-3pr), two-photon pump-probe (2pu-1pr), and two-photon pump-TSF-probe method (2pu-3pr) on a polycrystalline $MoS_2$ thin film. In the experiments, the probe frequency was scanned over a range of frequencies (x-axis) and the time delay T between the pump and probe beams was scanned over a range of values (y-axis). This provides a multidimensional correlation map of the excited sample. FIG. 4 shows the results of the four spectroscopies at a fixed time delay T between the pump and probe beams as both the pump beam and probe beams were scanned over ranges of frequencies. This is useful to resolve how systems excited with different energies evolve.

The three-photon-probe demonstrated in FIG. 3B is composed of three degenerate electric field interactions, i.e., each photon has the same frequency. However, the beauty of multiphoton probes lies in the fact that they need not be composed exclusively of degenerate interactions. FIGS. 5A-5B show the results of an experiment in which an $MoS_2$ thin film was pumped with 3.1 eV light (exciting into the C feature), and a two-dimensional TSF probe composed of three photons was used. In the two-dimensional TSF probe, one photon had frequency $\omega_1$ and the other two photons had frequency $\omega_2$ to provide $\omega_{probe} = 2\omega_2 + \omega_1$. In the different subplots, $\omega_1$ and $\omega_2$ were each scanned over a range of frequencies at different values of the pump-probe time delay, T, to resolve dynamics.

FIGS. 7A-7B show the results of an experiment in which a ~100 μm wide screw-dislocation grown $WS_2$ nanostructure was analyzed using a 2pu-3pr (top row, FIGS. 7A-7B) experiment and a 2pu-1pr (bottom row, FIGS. 7A-7B, measured using a reflective geometry) experiment in order to compare the two pump-probe spectroscopies. The rows show probe frequency in eV (x-axis, $3\hbar\omega_{probe}$ for top row and $\hbar\omega_{probe}$ for bottom row) versus pump-probe delay time (y-axis) with different frames for different pump colors (column titles). The 2pu-3pr experiment easily resolves a feature in the left-most columns, but 2pu-1pr is not able to resolve a feature above noise for the first two pump colors. The colormap in the first row is analogous to "signal_diff," and the colormap in the second row is analogous to "signal_ratio." FIG. 8A shows a plot of population response versus pump fluence from a $WS_2$ monolayer film obtained using 2pu-3pr. The pump energy was 0.99 eV. A quadratic relationship (solid line, guide to eye) is consistent with two photon absorption. FIG. 8B shows a representative plot of probe frequency versus pump-probe delay time from which the population response is derived. Colormap is analogous to "signal_diff."

CONCLUSIONS

This Example demonstrates techniques which are not susceptible to pump scatter, and therefore unlock the investigation of a new region of ultrafast dynamics in nanostructures. There are two important features of the techniques shown in this Example. First, instead of measuring the absorption/transmission/reflection coefficient of a sample (related to the linear polarizability), the sample's non-linear polarizability was measured. Specifically, the sample's ability to accomplish third harmonic generation of incident probe photons was measured. Second, instead of exciting a sample with photons of energy, E, samples were excited with photons of energy E/2. 2-photon absorption was accomplished to create excited states. Crucially, all pump scatter was far removed from the probe colors close to E, which eliminated susceptibility to pump scatter.

Using the described techniques, it is possible to measure multidimensional spectra of semiconductor nanostructures and map the relaxation of excited electronic states in nanostructures which defy methods like transient absorption spectroscopy. These techniques will be essential to measuring the ultrafast response of complex nanostructures.

Using the non-linear polarizability as a probe provides at least three advancements over the current state-of-the-art. First, instead of using a one-dimensional probe (color) as for TA, more than one color can be used (i.e., a multidimensional probe), e.g., 2 colors for a two-dimensional probe, 3 colors for a three-dimensional probe, etc. Judicious choice of these colors can lead to observation of how the coupling of different states changes when the sample is excited.

Second, transient absorption is a derived measurement in which a change in absorption is measured. In semiconductor nanostructures, a total conversion of the ground state into the excited state(s) will lead to a change in signal of ~5%. In the described measurements, a total change of the ground state to excited state leads to ~100% change in signal. The new method is therefore more sensitive to small changes in the ground state than conventional methods.

Third, transient absorption measurements on semiconductors are complicated by changes in the reflection coefficient due to a changing refractive index. Recent literature has shown that this type of artifact has tainted an entire field of ultrafast measurements on perovskite nanostructures which lead to many wrong conclusions. The described technique directly measures the non-linear polarizability and is agnostic to changes in reflectivity. The described technique sidesteps the artifact instead of removing the artifact with advanced optical theory and expensive computations, which is typically outside the training of many users of TA spectroscopy.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for pump-probe spectroscopy, the method comprising:
   (a) directing pump light having a frequency $\omega_{pump}$ at a location in a sample to excite a transition between two quantum states of a target entity in the sample,
   (b) directing probe light at the location to generate a coherent output signal having a frequency $\omega_{output}$ and a wavevector $k_{output}$,
   wherein the transition excited by the pump light is a multiphoton transition corresponding to a frequency difference of $n*\omega_{pump}$, wherein $n \geq 2$; or
   wherein the probe light is a set of m coherent light pulses, each coherent light pulse having a frequency $\omega_m$ and a wavevector $k_m$, wherein $m \geq 2$; or both; and
   (c) detecting the output signal as the probe light is scanned over a range of frequencies.

2. The method of claim 1, wherein at least two of the coherent light pulses in the set of m coherent light pulses have different frequencies.

3. The method of claim 1, further comprising repeating steps (a)-(c) at one or more different time delay T values between the pump light and the probe light or repeating steps (a)-(c) at one or more different values of $\omega_{pump}$ or both.

4. The method of claim 1, wherein the transition excited by the pump light is the multiphoton transition corresponding to the frequency difference of $n*\omega_{pump}$, wherein $n \geq 2$,
   wherein the probe light is a single coherent light pulse having a frequency $\omega_{probe}$ and a wavevector $k_{probe}$,
   and wherein $\omega_{output} = -\omega_{probe}$ and $k_{output} = -k_{probe}$.

5. The method of claim 4, wherein $n=2$, such that the transition excited by the pump light is a two-photon transition corresponding to the frequency difference of $2*\omega_{pump}$.

6. The method of claim 5, further comprising repeating steps (a)-(c) at one or more different time delay T values between the pump light and the probe light or repeating steps (a)-(c) at one or more different values of $\omega_{pump}$ or both.

7. The method of claim 1, wherein the transition excited by the pump light is a single-photon transition corresponding to a frequency difference of $\omega_{pump}$,
   wherein the probe light comprises the m coherent light pulses, each coherent light pulse having the frequency $\omega_m$ and the wavevector $k_m$, wherein $m \geq 2$,
   and wherein $\omega_{output} = \Sigma \pm \omega_m$ and $k_{output} = \Sigma \pm k_m$.

8. The method of claim 7, wherein at least two of the coherent light pulses in the set of m coherent light pulses have different frequencies.

9. The method of claim 7, wherein $m=3$ and $\omega_{output} = \pm\omega_1 \pm \omega_2 \pm \omega_3$ and $k_{output} = \pm k_1 \pm k_2 \pm k_3$.

10. The method of claim 9, wherein $\omega_{output} = \omega_1 + \omega_2 + \omega_3$ and $k_{output} = k_1 + k_2 + k_3$.

11. The method of claim 9, further comprising repeating steps (a)-(c) at one or more different time delay T values between the pump light and the probe light or repeating steps (a)-(c) at one or more different values of $\omega_{pump}$ or both.

12. The method of claim 1, wherein the transition excited by the pump light is the multiphoton transition corresponding to the frequency difference of $n*\omega_{pump}$, wherein $n \geq 2$,
   wherein the probe light comprises the m coherent light pulses, each coherent light pulse having the frequency $\omega_m$ and the wavevector $k_m$, wherein $m \geq 2$,
   and wherein $\omega_{output} = \pm \omega_m$ and $k_{output} = \Sigma \pm k_m$.

13. The method of claim 12, wherein at least two of the coherent light pulses in the set of m coherent light pulses have different frequencies.

14. The method of claim 12, wherein $n=2$, such that the transition excited by the pump light is a two-photon transition corresponding to the frequency difference of $2*\omega_{pump}$.

15. The method of claim 12, wherein $m=3$ and $\omega_{output} = \pm\omega_1 \pm \omega_2 \pm \omega_3$ and $k_{output} = \pm k_1 \pm k_2 \pm k_3$.

16. The method of claim 14, wherein $m=3$ and $\omega_{output} = \pm\omega_1 \pm \omega_2 \pm \omega_3$ and $k_{output} = \pm k_1 \pm k_2 \pm k_3$.

17. The method of claim 16, wherein $\omega_{output} = \omega_1 + \omega_2 + \omega_3$ and $k_{output} = k_1 + k_2 + k_3$.

18. The method of claim 16, further comprising repeating steps (a)-(c) at one or more different time delay T values between the pump light and the probe light or repeating steps (a)-(c) at one or more different values of $\omega_{pump}$ or both.

19. A system for pump-probe spectroscopy, the system comprising:
   optics configured to direct pump light having a frequency $\omega_{pump}$ at a location in a sample and to direct probe light at the location;
   a stage configured to support the sample;
   a detector positioned to detect an output signal; and
   a controller comprising a processor and a computer-readable medium operably coupled to the processor, the computer-readable medium having computer-readable instructions stored thereon that, when executed by the processor cause the system to
   (a) illuminate the location with the pump light having the frequency $\omega_{pump}$ to excite a transition between two quantum states of a target entity in the sample,
   (b) illuminate the location with the probe light to generate a coherent output signal having a frequency $\omega_{output}$ and a wavevector $k_{output}$,
   wherein the transition excited by the pump light is a multiphoton transition corresponding to a frequency difference of $n*\omega_{pump}$, wherein $n \geq 2$; or
   wherein the probe light is a set of m coherent light pulses, each coherent light pulse having a frequency $\omega_m$ and a wavevector $k_m$, wherein $m \geq 2$; or both; and
   (c) collect the detected the output signal as the probe light is scanned over a range of frequencies.

20. The system of claim 19, wherein at least two of the coherent light pulses in the set of m coherent light pulses have different frequencies.

21. The system of claim 19, wherein the computer-readable instructions, when executed by the processor cause the system to repeat steps (a)-(c) at one or more different time delay T values between the pump light and the probe light or repeat steps (a)-(c) at one or more different values of $\omega_{pump}$ or both.

22. The system of claim 19, wherein the transition excited by the pump light is the multiphoton transition corresponding to the frequency difference of $n*\omega_{pump}$, wherein $n \geq 2$,
   wherein the probe light is a single coherent light pulse having a frequency $\omega_{pump}$ and a wavevector $k_{probe}$,
   and wherein $\omega_{output} = -\omega_{probe}$ and $k_{output} = -k_{probe}$.

23. The system of claim 22, wherein n=2, such that the transition excited by the pump light is a two-photon transition corresponding to the frequency difference of $2*\omega_{pump}$.

24. The system of claim 23, wherein the computer-readable instructions, when executed by the processor cause the system to repeat steps (a)-(c) at one or more different time delay T values between the pump light and the probe light or repeat steps (a)-(c) at one or more different values of $\omega_{pump}$ or both.

25. The system of claim 19, wherein the transition excited by the pump light is a single-photon transition corresponding to a frequency difference of $\omega_{pump}$, wherein the probe light comprises the m coherent light pulses, each coherent light pulse having the frequency $\omega_m$ and the wavevector $k_m$, wherein m ≥2, and wherein $\omega_{output}=Y\pm\omega_m$ and $k_{output}=\Sigma\pm k_m$.

26. The system of claim 25, wherein at least two of the coherent light pulses in the set of m coherent light pulses have different frequencies.

27. The system of claim 25, wherein m=3 and $\omega_{output}=\pm\omega_1\pm\omega_2\pm\omega_3$ and $k_{output}=\pm k_1\pm k_2\pm k_3$.

28. The system of claim 27, wherein $\omega_{output}=\omega_1+\omega_2+\omega_3$ and $k_{output}=k_1+k_2+k_3$.

29. The system of claim 27, wherein the computer-readable instructions, when executed by the processor cause the system to repeat steps (a)-(c) at one or more different time delay T values between the pump light and the probe light or repeat steps (a)-(c) at one or more different values of $\omega_{pump}$ or both.

30. The system of claim 19, wherein the transition excited by the pump light is the multiphoton transition corresponding to the frequency difference of $n*\omega_{pump}$, wherein n≥2, wherein the probe light comprises the m coherent light pulses, each coherent light pulse having the frequency $\omega_m$ and the wavevector $k_m$, wherein m≥2, and wherein $\omega_{output}=Y\pm\omega_m$ and $k_{output}=Y\pm k_m$.

31. The system of claim 30, wherein at least two of the coherent light pulses in the set of m coherent light pulses have different frequencies.

32. The system of claim 30, wherein n=2, such that the transition excited by the pump light is a two-photon transition corresponding to the frequency difference of $2*\omega_{pump}$.

33. The system of claim 30, wherein m=3 and $\omega_{output}=\pm\omega_1\pm\omega_2\pm\omega_3$ and $k_{output}=\pm k_1\pm k_2\pm k_3$.

34. The system of claim 32, wherein m=3 and $\omega_{output}=\pm\omega_1\pm\omega_2\pm\omega_3$ and $k_{output}=\pm k_1\pm k_2\pm k_3$.

35. The system of claim 34, wherein $\omega_{output}=\omega_1+\omega_2+\omega_3$ and $k_{output}=k_1+k_2+k_3$.

36. The system of claim 34, wherein the computer-readable instructions, when executed by the processor cause the system to repeat steps (a)-(c) at one or more different time delay T values between the pump light and the probe light or repeat steps (a)-(c) at one or more different values of $\omega_{pump}$ or both.

* * * * *

UNITED STATES PATENT AND TRADEMARK OFFICE
CERTIFICATE OF CORRECTION

PATENT NO. : 10,823,664 B2
APPLICATION NO. : 16/446750
DATED : November 3, 2020
INVENTOR(S) : Darien James Morrow et al.

Page 1 of 1

It is certified that error appears in the above-identified patent and that said Letters Patent is hereby corrected as shown below:

In the Claims

Claim 25, Column 17, Line 15:
Delete the phrase "wherein $\omega_{output} = Y \pm \omega_m$ and $k_{output} = \Sigma \pm k_m$." and replace with --wherein $\omega_{output} = \Sigma \pm \omega_m$ and $k_{output} = \Sigma \pm k_m$.--.

Claim 30, Column 18, Line 7:
Delete the phrase "and wherein $\omega_{output} = Y \pm \omega_m$ and $k_{output} = Y \pm k_m$." and replace with --and wherein $\omega_{output} = \Sigma \pm \omega_m$ and $k_{output} = \Sigma \pm k_m$.--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*